(12) United States Patent
Dong et al.

(10) Patent No.: US 11,928,565 B2
(45) Date of Patent: *Mar. 12, 2024

(54) AUTOMATED MODEL BUILDING AND UPDATING ENVIRONMENT

(71) Applicants: Chevron U.S.A. Inc., San Ramon, CA (US); University of Southern California, Los Angeles, CA (US)

(72) Inventors: Yining Dong, San Jose, CA (US); Alisha Deshpande, Houston, TX (US); Yingying Zheng, Thousand Oaks, CA (US); Lisa Ann Brenskelle, Houston, TX (US); Si-Zhao Qin, Los Angeles, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,149

(22) Filed: Oct. 24, 2022

(65) Prior Publication Data

US 2023/0252348 A1 Aug. 10, 2023

Related U.S. Application Data

(63) Continuation of application No. 16/865,081, filed on May 1, 2020, now Pat. No. 11,507,069.
(Continued)

(51) Int. Cl.
*G06N 20/00* (2019.01)
*G05B 19/406* (2006.01)
(Continued)

(52) U.S. Cl.
CPC .......... *G06N 20/00* (2019.01); *G05B 19/406* (2013.01); *G05B 19/408* (2013.01);
(Continued)

(58) Field of Classification Search
CPC ..... G06N 20/00; G06F 18/2135; G06F 18/23; G06F 9/542; G05B 19/406; G05B 19/408; G05B 19/41885
See application file for complete search history.

(56) References Cited

U.S. PATENT DOCUMENTS 10,876,867 B2 12/2020 Deshpande et al.
11,138,520 B2 * 10/2021 Ganti ..................... G06N 20/00
(Continued)

OTHER PUBLICATIONS

"Data Mining and Knowledge Discovery Handbook", Second Edition, Oded Maimom and Lior Rokack editors, Springer, New York, NY (2010) pp. 269-298; 469-504; 573-589; 855-874; and 931-948.
(Continued)

*Primary Examiner* — Thuy Dao
(74) *Attorney, Agent, or Firm* — William N. Hughet; Melissa M. Hayworth; Ana C. Jaquez

(57) ABSTRACT

Methods and systems for building and maintaining model(s) of a physical process are disclosed. One method includes receiving training data associated with a plurality of different data sources, and performing a clustering process to form one or more clusters. For each of the one or more clusters, the method includes building a data model based on the training data associated with the data sources in the cluster, automatically performing a data cleansing process on operational data based on the data model, and automatically updating the data model based on updated training data that is received as operational data. For data sources excluded from the clusters, automatic building, data cleansing, and updating of models can also be applied.

20 Claims, 14 Drawing Sheets

Related U.S. Application Data

(60) Provisional application No. 62/843,147, filed on May 3, 2019.

(51) Int. Cl.
  *G05B 19/408* (2006.01)
  *G05B 19/418* (2006.01)
  *G06F 9/445* (2018.01)
  *G06F 9/455* (2018.01)
  *G06F 9/54* (2006.01)
  *G06F 18/2135* (2023.01)
  *G06F 18/23* (2023.01)
  *G06N 7/00* (2023.01)

(52) U.S. Cl.
  CPC ....... *G05B 19/41885* (2013.01); *G06F 9/542* (2013.01); *G06F 18/2135* (2023.01); *G06F 18/23* (2023.01)

(56) References Cited

U.S. PATENT DOCUMENTS

| | | | |
|---|---|---|---|
| 11,238,366 B2 * | 2/2022 | Bolding | H04L 63/1416 |
| 2014/0108359 A1 | 4/2014 | Banaei-Kashani et al. | |
| 2016/0179599 A1 | 6/2016 | Deshpande et al. | |
| 2019/0294927 A1 | 9/2019 | Guttmann | |
| 2020/0201293 A1 | 6/2020 | Hou | |

OTHER PUBLICATIONS

Qin, S. J., & Dunia, R. "Determining the number of principal components for best reconstruction." Journal of Process Control, 10, Nos. 2-3 (2000), 245-250.

Li Weihua, et al., "Recursive PCA for Adaptive Process Monitoring." Journal of Process Control 10, No. 5 (2000): 471-486.

* cited by examiner

AUTOMATED MODEL BUILDING AND UPDATING ENVIRONMENT

RELATED APPLICATION

This application is a Continuation of U.S. patent application Ser. No. 16/865,081 filed May 1, 2020, now U.S. Pat. No. 11,507,069, which claims the benefit of U.S. Provisional Application No. 62/843,147, filed May 3, 2019, the contents of both of which are hereby incorporated by reference in their entireties.

TECHNICAL FIELD

The present disclosure relates generally to building and maintenance of models, such as models of industrial processes. In some implementations, the present disclosure relates to an automated model building and updating environment.

BACKGROUND

Oil production facilities are large scale operations, often including thousands of sensors used to measure pressures, temperatures, flow rates, levels, compositions, and various other characteristics. The sensors included in such facilities may provide a wrong signal, and sensors may fail. Accordingly, process measurements are inevitably corrupted by errors during the measurement, processing and transmission of the measured signal. These errors can take a variety of forms. These can include duplicate values, values containing a bias, drifting values, null/unknown values, values that exceed data range limits, outlier values, propagation of suspect or poor quality data, and missing data due to field telemetry failures. Other errors may exist as well.

The quality of the oil field data significantly affects the oil production performance and the profit gained from using various data and/or analysis systems for process monitoring, online optimization, and control. Unfortunately, based on the various errors that can occur, oil field data often contain errors and missing values that invalidate the information used for production optimization.

To improve the accuracy of process data, fault detection techniques have been developed to determine when and how such sensors fail. For example, data driven models including principal component analysis (PCA) or partial least squares (PLS) have been developed to monitor process statistics to detect such failures. Furthermore, a Kalman filter can be used to develop interpolation methods for detecting outliers and reconstructing missing data streams.

However, to date, scaling of such fault detection and data cleansing systems has been problematic. Existing systems do not provide a solution that is adequately scalable to large-scale data collection systems, for example in the context of industrial processes such as the oil production facilities described above.

Still further drawbacks exist with respect to current data cleansing systems, which predominantly rely on relationships between variables for fault detection. For example, there may be field instruments in a facility that are somewhat isolated and do not have any significant correlation with any other field instrument. For such field instruments, an approach which depends on correlation between input variables to a model to detect data errors cannot be applied. However, such field instruments may gather data that is grouped with other data from correlated sensors, and therefore correlation between input variables may be desirable for some, but not all, field instruments or data streams.

For the above and other reasons, it is now recognized that improvements in detection and addressing errors in large scale dynamic systems are desirable.

SUMMARY

In accordance with the present disclosure, the above and other issues may be addressed by the following:

In a first aspect, a method of building and maintaining models of a physical process is disclosed. The method includes receiving training data associated with a plurality of different data sources, each being associated with a physical process, and performing a clustering process on the plurality of data sources to form one or more clusters, the plurality of data sources further including at least one single data source not included within the one or more clusters. The method includes, for each of the one or more clusters: building a data model based at least in part on the training data associated with the data sources included in the cluster; automatically performing a data cleansing process on operational data based on the data model, the operational data corresponding to the data sources included in the cluster; and automatically updating the data model based at least in part on updated training data, the updated training data corresponding to recent data received as operational data for the data sources included in the cluster.

In some instances, the method can still further include, for each single data source not included in a cluster, building a single source data model based at least in part on the training data associated with the single data source, and automatically performing a data cleansing process on operational data based on the data model, the operational data corresponding to data collected from the single data source. In some further instances, the method can include automatically updating the single source data model. In embodiments of this disclosure, training data generally corresponds to operational data that is selected for use in training and/or updating data models.

In a second aspect, a system for building and maintaining models of a physical process is disclosed. The system includes a communication interface configured to receive data from a plurality of different data sources, and a processor communicatively connected to the communication interface. The system also includes a memory communicatively connected to the processor and communication interface, the memory storing instructions comprising an automated model building and maintenance application. When executed by the processor, the application causes the system to: automatically perform a clustering process on training data received from the plurality of data sources to form one or more clusters, the plurality of data sources further including at least one single data source not included within the one or more clusters, and for each of the one or more clusters: build a data model based at least in part on the training data associated with the data sources included in the cluster; automatically perform a data cleansing process on operational data based on the data model, the operational data corresponding to the data sources included in the cluster; and automatically update the data model based at least in part on updated training data, the updated training data corresponding to recent data received as operational data.

In some instances, the system can still further build, for each single data source not included in a cluster, a single source data model based at least in part on the training data associated with the single data source, and automatically perform a data cleansing process on operational data based on the data model. The operational data corresponds to data collected from the single data source. In some further instances, the system can automatically update the single source data model.

In a third aspect, a system for automatically monitoring a physical process is disclosed. The system includes a communication interface configured to receive data from a plurality of different data sources associated with a physical process, the plurality of different data sources including one or more sensors associated with the physical process. The system further includes a processor communicatively connected to the communication interface, and a memory communicatively connected to the processor and communication interface. The memory stores instructions comprising an automated model building and maintenance application which, when executed by the processor, causes the system to: automatically perform a clustering process on training data received from the plurality of data sources to form one or more clusters, the plurality of data sources further including at least one single data source not included within the one or more clusters. The application further causes the system to: for each of the one or more clusters: build a data model based at least in part on the training data associated with the data sources included in the cluster; automatically perform a data cleansing process on operational data based on the data model, the operational data corresponding to the data sources included in the cluster; and automatically update the data model based at least in part on updated training data, the updated training data corresponding to recent data received as operational data. The application also causes the system to, for each single data source: build a single source data model based at least in part on the training data associated with the single data source; automatically perform a data cleansing process on tag data based on the data model, the tag data corresponding to operational data collected from the single data source; and automatically update the single source data model.

DETAILED DESCRIPTION

As briefly described above, embodiments of the present invention are directed to a platform that provides automated management of data models, in particular models used for purposes of monitoring and cleansing streaming or historical data from a variety of data sources. Such a platform is useable in a number of contexts and provides a number of advantages over existing systems. In particular, the systems and methods disclosed herein save significant user time and permit automated model building and maintenance, thereby allowing models used for data cleansing to be applied in large scale environments. Furthermore, within such large scale environments, faulty sensors or other anomalies can be detected and corrected. As such, false alarms or other alarms on bad data that could waste operator time or cause misoperation of an industrial process can be avoided. Additionally, data based analysis of industrial processes leads to improved identification of relationships between industrial process features. This can lead to, for example, development of inferential sensors, optimization algorithms, or other advanced control techniques.

Figure 1:
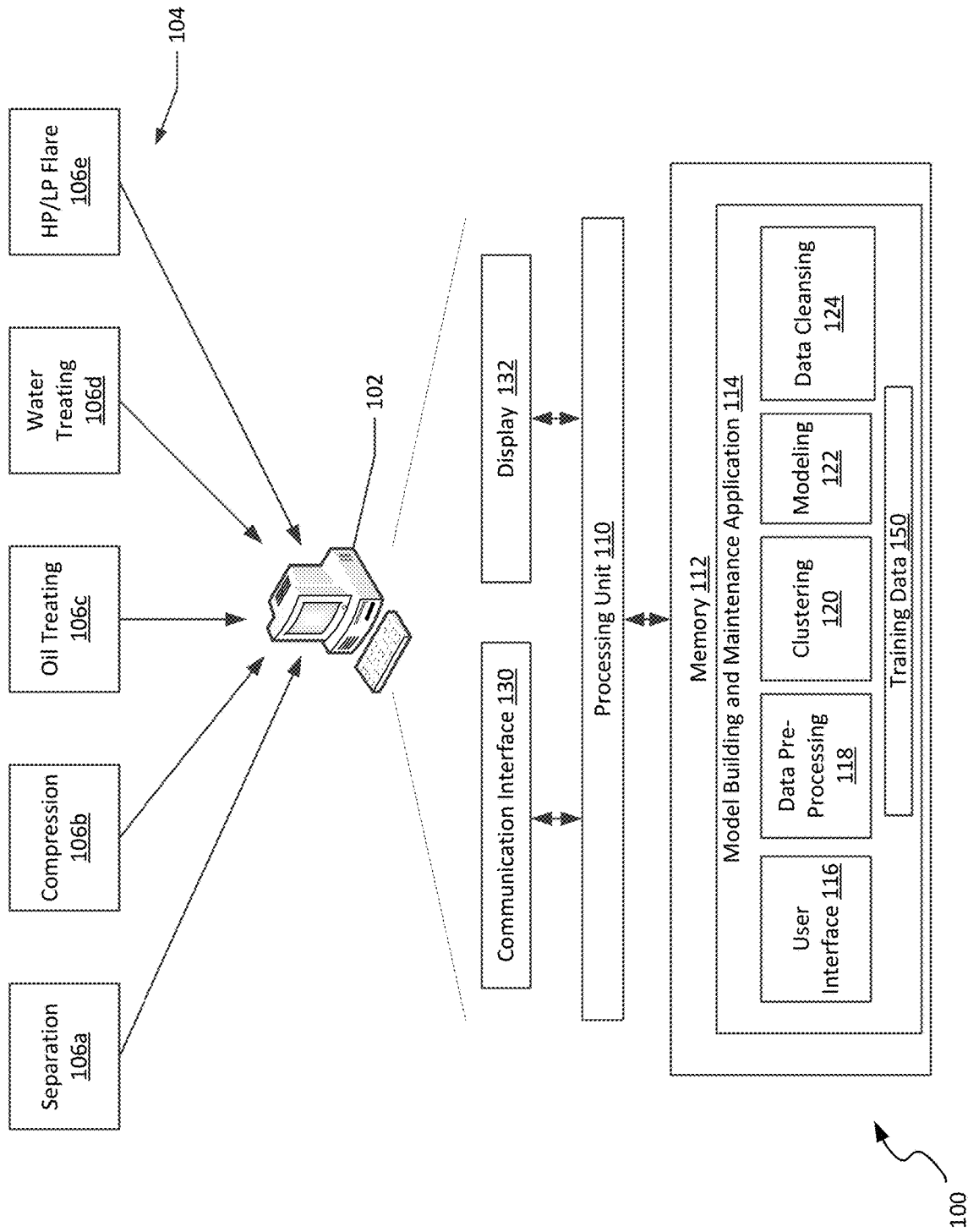
FIG. 1 illustrates a system for automatically building & maintaining models of a physical process, in the context of an oil production facility, in an example embodiment.

Referring now to FIG. 1, an example system 100 is used to implement an automated model building & maintaining platform, as provided by the present disclosure. In particular, the example system 100 integrates a plurality of data streams of different types from an oil production facility, such as an oil field. As illustrated in the embodiment shown, a computing system 102 receives data from an oil production facility 104, which includes a plurality of subsystems, including, for example, a separation system 106*a*, a compression system 106*b*, an oil treating system 106*c*, a water treating system 106*d*, and an HP/LP Flare system 106*e*.

The oil production facility 104 can be any of a variety of types of oil production facilities, such as a land-based or offshore drilling system. In the embodiment shown, the subsystems of the oil production facility 104 each are associated with a variety of different types of data, and have sensors that can measure and report that data in the form of data streams. For example, the separation system 106*a* may include pressure and temperature sensors and associated sensors that measure backpressure as well as inlet and outlet temperatures. In such a system, various errors may occur, for example sensor drift or bias conditions. The compression system 106*b* can include a pressure control for controlling suction, as well as a variety of stage discharge temperature controllers and associated sensors. In addition, the oil treating system 106c, water treating system 106d, and HP/LP Flare system 106e can each have a variety of types of sensors, including pressure and temperature sensors, that can be periodically sampled to generate a data stream to be monitored by the computing system 102. It is recognized that the various system 106a-e are intended as exemplary, and that various other systems could have sensors that are incorporated into data streams provided to the computing system 102 as well.

In the embodiment shown, the computing system 102 includes a processor 110 and a memory 112. The processor 110 can be any of a variety of types of programmable circuits capable of executing computer-readable instructions to perform various tasks, such as mathematical and communication tasks.

The memory 112 can include any of a variety of memory devices, such as using various types of computer-readable or computer storage media. A computer storage medium or computer-readable medium may be any medium that can contain or store the program for use by or in connection with the instruction execution system, apparatus, or device. In example embodiments, the computer storage medium is embodied as a computer storage device, such as a memory or mass storage device. In particular embodiments, the computer-readable media and computer storage media of the present disclosure comprise at least some tangible devices, and in specific embodiments such computer-readable media and computer storage media include exclusively non-transitory media.

In the embodiment shown, the memory 112 stores a model building and maintenance application 114. The model building and maintenance application 114 performs analysis of dynamic data, such as is received in data streams (e.g., from an oil production facility 104), for building & maintaining models that are adapted for detecting faults and reconstructing correct values in data. The model building and maintenance application 114, while shown as a single block in FIG. 1, is intended to include a collection of various sets of machine-executable instructions which may be grouped as modules or similar collections. Indeed, the model building and maintenance application 114 may reside on the memory 112 as a single application; or, in an actual implementation, may reside on the memory 112 as multiple separate applications. Thus, the use of a single block in FIG. 1 is used as a matter of convenience and not limitation.

In the embodiment shown, the model building and maintenance application 114 includes a user interface 116, data preprocessing component 118, clustering module 120, modeling module 122, and data cleansing module 124. The memory 112 also can store training data 150, e.g., for use by the model building and maintenance application 114.

The user interface 116 provides a user interaction mechanism to the model building and maintenance application 114, for purposes of entering model parameters, providing initial training data, viewing alerts associated with the industrial process, or viewing results of the modules 118-124. Example results are illustrated and discussed in further detail below.

The data preprocessing component 118 performs one or more preprocessing operations on training data 150 which can then be used by the modeling module 122. For example, the data preprocessing component 118 can adjust (e.g., remove) outliers from the training data 150 and can remove large sections of missing data from the training data 150. In some embodiments, outlier data can be defined as data having values that are further than a predetermined standard deviation from the mean of the data (e.g., four times the standard deviation).

The clustering module 120 performs a clustering analysis on each of the data sources to be included in the automated model building and maintenance process. As in the example of an oilfield or oil production facility, the data sources can represent different operational parameters, and may be gathered in the form of sensor readings associated with different portions of the oil production process. Accordingly, the data sources will typically be of different types and representing different operational parameters of an industrial process. However, there may be a relationship among two or more of those operational parameters. Accordingly, the clustering analysis identifies one or more clusters of data sources that can be modeled together in a way that provides insight into whether any one of those data sources is generating faulty data.

In an example embodiment, the clustering module 120 will perform an automated clustering operation on at least some of the data sources included in an industrial process. Optionally, prior to execution of the clustering analysis, a user may identify one or more data sources that will be excluded from the clustering analysis. This exclusion (if performed) may be based on, for example, recognition that those data sources can be modeled using heuristics or other simple methods that do not require models, e.g., to reduce computational load of the clustering operation. For the data sources included in the clustering operation, any of a number of clustering algorithms may be used. For example, in one embodiment, a hierarchical clustering methodology can be used. The hierarchical clustering may utilize a predefined cutoff level, which is related to the minimum correlation within the cluster as well as an optional maximum number of data sources that can be included in any one cluster. In an example embodiment, a cutoff level of 0.6 (which guarantees correlation >0.8 within a cluster) can be used in conjunction with a hierarchical clustering methodology, with a maximum number of 10-15 data sources (also referred to as "tags") being able to be grouped into a common cluster. In another embodiment, a k-means clustering methodology may be used, where k represents a selected number of clusters to be generated. Other clustering methodologies may be used as well.

The modeling module 122 generates model parameters for each data source or cluster of data sources. In particular, for data sources that are included in a particular cluster, the modeling module 122 will generate a set of model parameters for that cluster, while for data sources that are managed individually, the modeling module 122 will generate a set of model parameters for that individual data source. In example embodiments, the modeling module 122 performs a dynamic principal components analysis (DPCA) on the clustered data sources to define a set of model parameters. In still further example embodiments, the modeling module 122 performs a single data source modeling operation (for example, an auto-regressive recursive least squares modeling operation) to generate the set of model parameters. In such examples, a method utilizing a wavelet transform may be applied to the data obtained from the single data source, with faults detected based on wavelet coefficients, with any faulty data reconstructed using the single data source model.

In example embodiments, the modeling module 122 may execute based on initial data. In further embodiments, the modeling module 122 may be configured to be triggered by the model building and maintenance application 114 to automatically update models in response to specific events (e.g., upon user request, after a period of time has elapsed, based on a threshold frequency of anomalous occurrences, or based on model quality degradation indicated by a model residual or prediction error above a threshold, as noted below). The modeling module 122 may, for example, perform a first process to build a model, and a different, second process to maintain or update existing models. In certain embodiments, the first process may include a DPCA process to initially build a model, and the second process may include a recursive DPCA process to maintain the model.

The data cleansing module 124 operates to determine whether subsequently received operational data (e.g., real-time data or other operational data, such as historical data) is anomalous. For the clustered data sources, the data cleansing module 124 works in conjunction with the model parameters generated by the modeling module to detect anomalous data. In example embodiments, the data cleansing module 124 replaces anomalous data with corrected data based on model parameters. Details regarding such data cleansing processes performed on both clusters and individual data sources are described below.

It is noted that in particular embodiments, the data preprocessing component 118 may be configured to execute prior to the clustering analysis performed by the clustering module 120 for initial model building. However, the data preprocessing may occur with respect to new training data for purposes of updating the model, e.g., for clustered tag models.

The computing system 102 can also include a communication interface 130 configured to receive data streams from the oil production facility 104, and transmit notifications as generated by the model building and maintenance application 114, as well as a display 132 for presenting a user interface associated with the model building and maintenance application 114. In various embodiments, the computing system 102 can include additional components, such as peripheral I/O devices, for example to allow a user to interact with the user interfaces generated by the model building and maintenance application.

Figure 2:
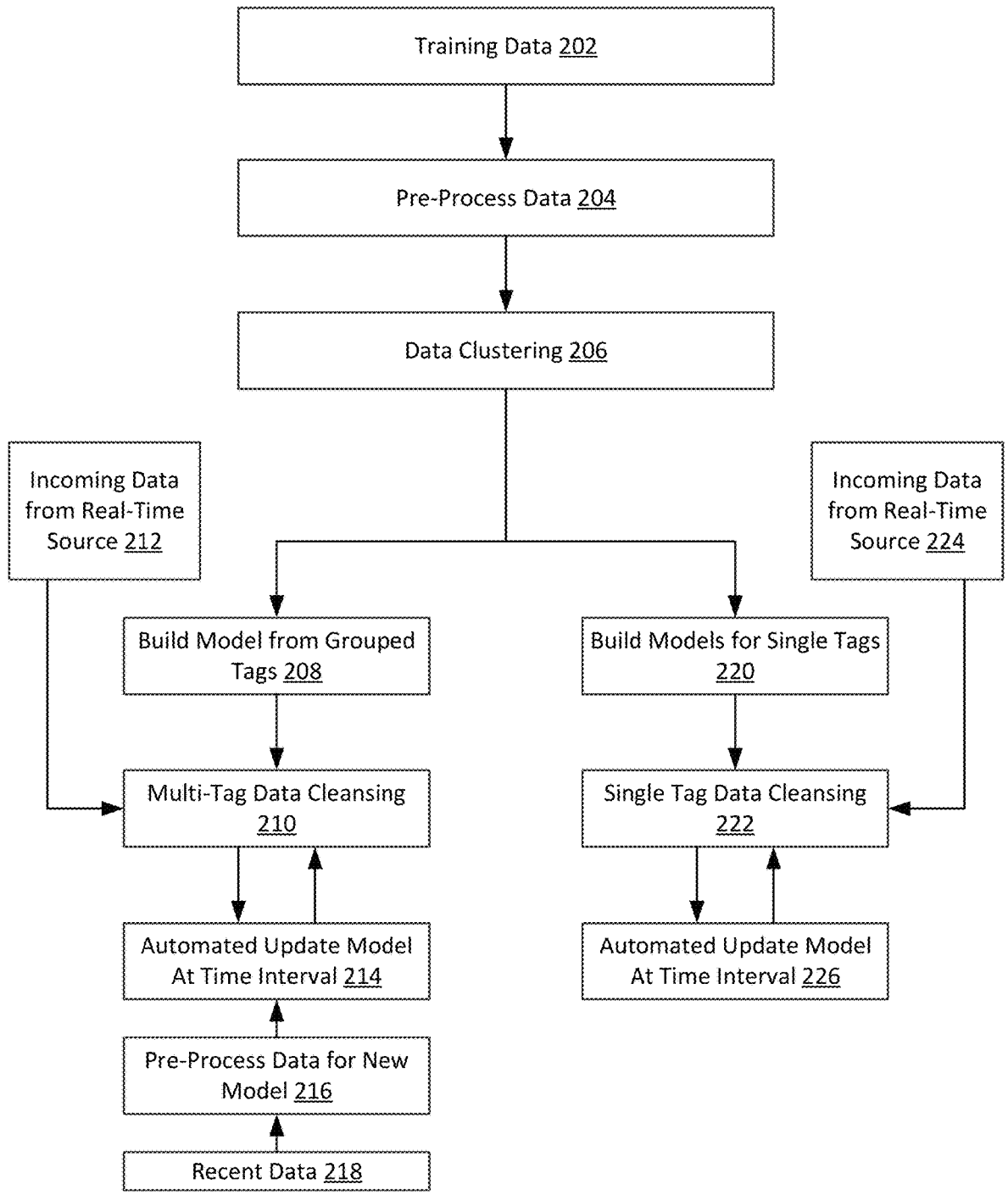
FIG. 2 illustrates an example method for managing initial building of and updates to a model of a physical process, according to an example embodiment.

Referring now to FIG. 2, an example process 200 is illustrated for automatically building & maintaining models used to cleanse data in a data set. The data set used in process 200 can be, for example, a collection of data streams from a data source (or plurality of data sources), such as from the oil production facility 104 of FIG. 1.

In the embodiment shown, the process 200 generally includes receipt of training data 202. The training data 202 can be, for example, a portion of data received from the plurality of data streams or data sources.

The process 200 also includes preprocessing data (at 204). Preprocessing the data can include, for example, removal of grossly erroneous data prior to use of the data in generating models of data sources. Erroneous data that can include for example a lack of data, or data being a clear outlier from the data that would be expected. Clear outliers can include data outside a predetermined threshold such as a multiple of the standard deviation from a mean data value. In one example, a multiple of the standard deviation of 4.0 is used. Other deviation amounts (e.g., multiples of the standard deviation) could be used as well, and could be set using a user interface, such as described above in conjunction with FIG. 1.

In the embodiment shown, the process 200 further includes data clustering (at 206). The data clustering can be performed by a clustering module such as shown in FIG. 1. The data clustering can be performed as an automated hierarchical data clustering using a cutoff level and a maximum number of data sources per cluster. In one example the cutoff level can be set at 0.6 or higher. Additionally in an example, the maximum number of data sources per cluster can be set at 10 to 15 data sources per cluster. In example embodiments, the automated hierarchical clustering uses a measure of dissimilarity between sets of observations among different data sources. For example, a dissimilarity matrix can be represented as:

$$D(i,j) = \sqrt{1 - R(i,j)^2}$$

Accordingly, a distance between sets can be defined as:

$$\max\{d(a,b) : a \in A, b \in B\}$$

This represents the complete linkage (also known as furthest neighbor) method of hierarchical clustering. Details regarding the hierarchical clustering and other clustering methods are provided in: Maimon, Oded, et al., "Data mining and knowledge discovery handbook." (2005), the disclosure of which is hereby incorporated by reference in its entirety.

In example implementations, sets having a distance to each other that is below a cutoff value are merged together to form a cluster. Therefore, the final number of clusters is automatically determined by the specified cutoff level. One example of such a hierarchical clustering process is illustrated in further detail below.

In example embodiments, the data clustering will result in one or more clusters, as well as one or more single data sources, or tags. For each of the clusters, a model is built (at 208) for purposes of data cleansing. In an example embodiment, the model for a cluster is built using DPCA. The DPCA model will generate a set of parameters that are associated with the cluster. Based on the DPCA model, a data cleansing operation (at 210) can be performed on operational data received from the data sources included in the cluster (at 212). The operational data may include real-time data or historical data received from a data source. An example of the DPCA-based model building and data cleansing process is described in U.S. patent application Ser. No. 15/811,477, entitled "Fault Detection System Utilizing Dynamic Principal Components Analysis", and U.S. patent application Ser. No. 13/781,623, entitled "Scalable Data Processing Framework for Dynamic Data Cleansing", the disclosures of each of which are hereby incorporated by reference in their entireties.

Once an initial model is built and operational data is received for purposes of data cleansing as noted above, a data cleansing process may proceed. At some time after the initial model is built, it may be determined that the model should be updated. This determination can be performed by a user or can be performed automatically upon occurrence of a predetermined event or time interval, to create an updated model. Updates to the initial model, as well as updates to subsequently-created updated models, may be generated either concurrently with the data cleansing process using the existing (and then-current) initial or updated model, or at a time when the data cleansing process is interrupted (or in the event data cleansing occurs on a batched basis on operational data, where updating may occur between batches).

In the embodiment shown, an automated update to the model for each cluster is provided at a predetermined time period (at 214). The automated update to the model can be based, for example, on more recent data 218 provided to a further preprocessing operation (at 216). The recent data 218 can be selected from operational data received at the model after the initial model build; and may include only the recent data or any combination of two or more of the recent data, previously cleaned data, or the initial operational data. Accordingly, the model will be periodically updated to reflect current operation of the physical process being monitored, as reflected by the data received from the data sources included in the particular cluster that is modeled. In alternative embodiments, model updating may be performed in response to model quality degradation. Such degradation may be indicated by model residual or prediction error greater than a threshold, or measures of model change such as dissimilarity between the current model and the model that would result if an update were performed.

For the one or more single data sources, models are built for the individual data sources (at 220). The models for the individual data sources also include parameters which can be used as part of a single tag data cleansing process, specifically to reconstruct correct data when a fault is detected (at 222). The single tag data cleansing process 222 can be performed on operational data, such as real-time data or historical data received from a data source (at 224). An example of the single tag data cleansing process is described in U.S. patent application Ser. No. 14/937,701, entitled "Data Processing Framework for Data Cleansing", the disclosure of which is hereby incorporated by reference in its entirety.

As with the models generated from clustered data, the single tag data cleansing process uses a model that can similarly be updated. In example embodiments, an automated updating of a single tag data model can be performed (at 226). The updating of the single tag data model can be performed concurrently with execution of the single tag data cleansing process, and may be executed at a predetermined time or in response to a predetermined event, such as exceeding a threshold frequency of anomalous occurrences. Updating may also be initiated by a user or upon observation of quality degradation of the model being used in the single tag data cleansing process.

Referring to FIGS. 1-2 generally, although the present application is discussed in the context of an oil processing facility, it is noted that the automated model building and maintenance framework discussed herein is applicable in a variety of contexts. For example, other types of large-scale industrial processes can benefit from such a system, since it is capable of estimating correct operational data at large scale in the event of erroneous data received from sensors associated with such an industrial process, and can either directly correct the data that is logged, and/or alert a user in an accurate and rapid fashion as to erroneous behavior of the industrial process or sensor associated therewith.

Figure 3:
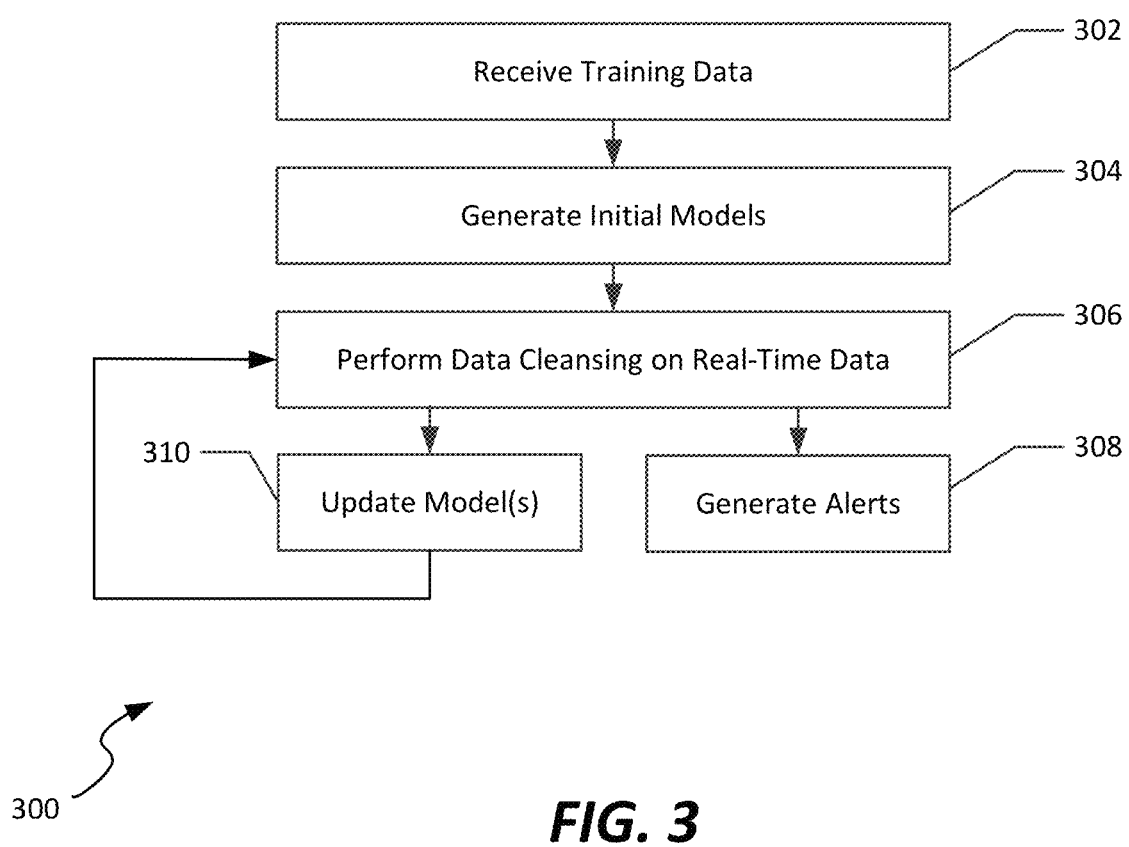
FIG. 3 illustrates an example method of operation of the system described above in connection with FIG. 1.

Accordingly, in use, the method 200 and system 100 of FIGS. 1-2 can be operated in accordance with the general process 300 outlined in FIG. 3. In particular, process 300 includes receiving training data (at 302) and generating an initial set of models (at 304), including performing pre-processing, clustering, and modeling as discussed above. Once model parameters are generated for each of the data sources for which data cleansing is to be applied, a data cleansing operation can be performed on operational data, such as real-time data or historical data from those data sources (at 306). To the extent anomalies are detected in that operational data, one or more alerts can be generated and presented to a relevant user and/or a corrected value can be automatically calculated. (at 308). Concurrently with operational data cleansing, at periodic intervals (definable by a user or by the system itself based on detected degradation of model performance), models can be updated using more recent data (at 310). For example, a user may opt to update a model, may select a predetermined time (either a current time, a time in the future, or a recurring time) at which models should be updated; the user may alternatively select a threshold for frequency or number of anomalous occurrences detected by the model, or some other metric for determining model performance that may indicate that the model should be updated with additional/different training data. Additionally, the user may select to update the model in response to quality degradation indicated by a model residual or prediction error greater than a threshold, or measures of model change such as dissimilarity between the current model and a resulting model if an update were performed. The updated models can then be used for continued data cleansing of the operational data (returning to 306).

Figure 4:
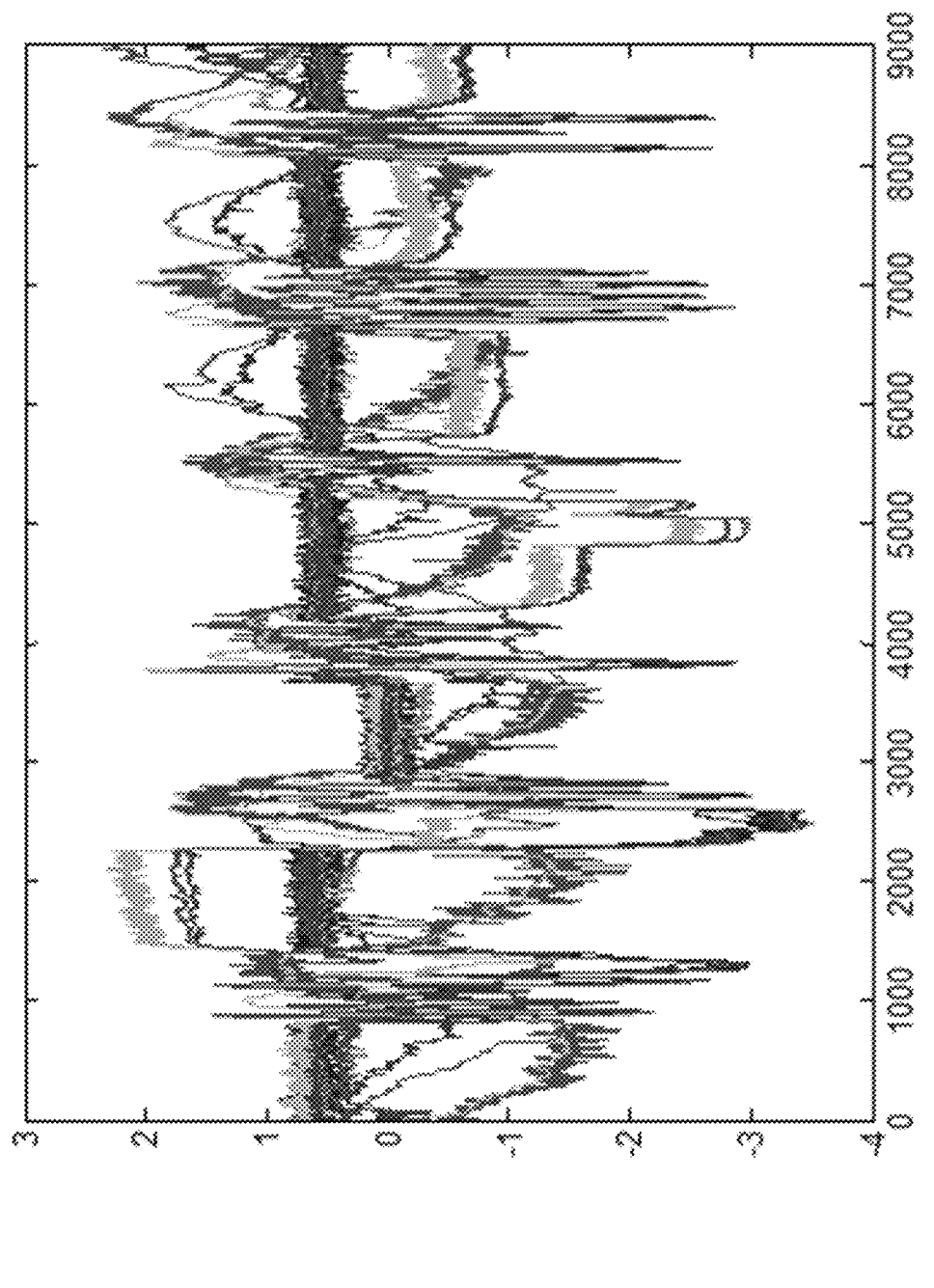
FIG. 4 illustrates an example dataset on which a clustering analysis can be performed.

Referring now to FIGS. 4-14 of the present disclosure, specific examples of operation of the automated model creation and maintenance features are discussed. FIG. 4 illustrates a graph 400 showing 16 different data streams over a period of 9000 seconds. As seen in this figure, even 16 different data streams can result in unwieldy data sets in terms of correlating specific data streams to one another.

Figure 5:
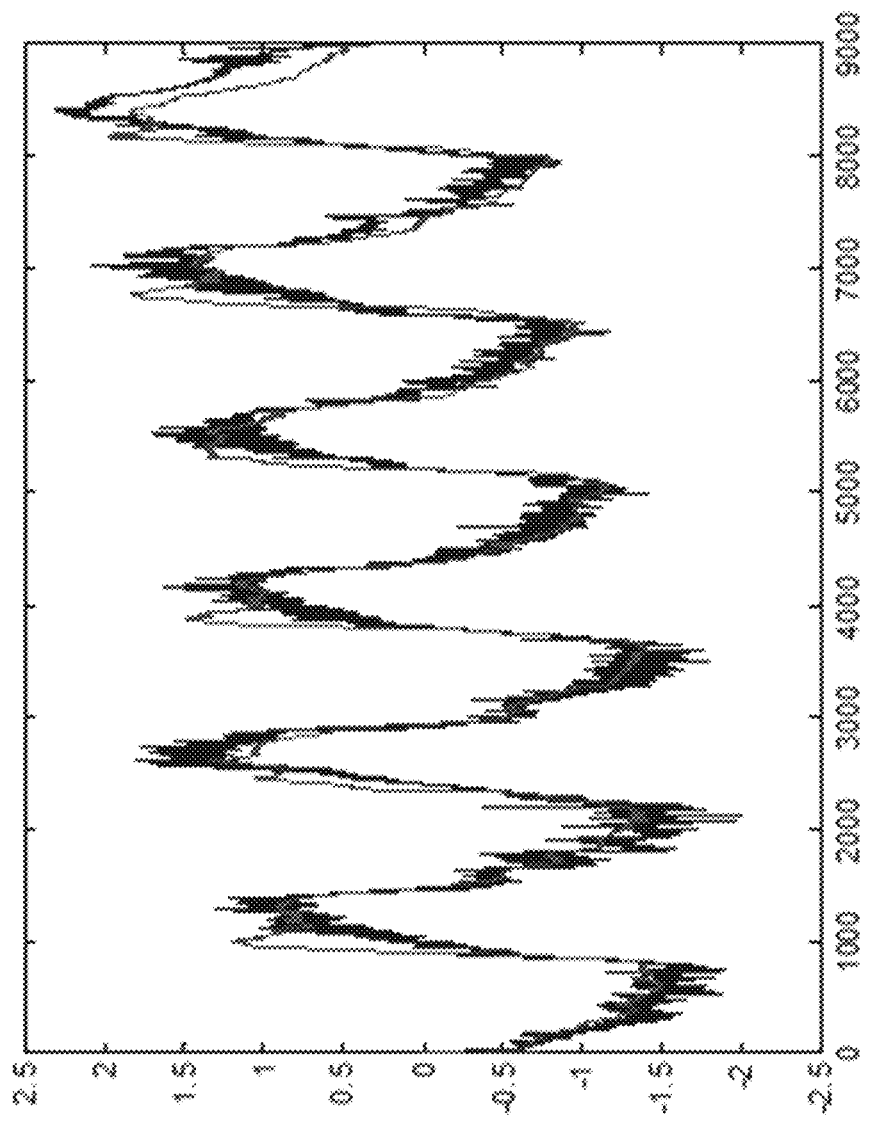
FIG. 5 illustrates a first cluster determined according to K-means clustering from among the dataset of FIG. 4, in an example embodiment.

In some embodiments, a K-means clustering method can be used. K-means clustering refers generally to a vector quantization methodology used to identify clusters of comparable data. The K-means clustering method results in clusters as seen in FIGS. 5-8, which show graphs 500, 600, 700, 800, respectively, of plots of clustered data streams. As seen in those figures, FIG. 5 illustrates a graph 500 of two of the data streams from the graph 400 of FIG. 4, while graph 600 of FIG. 6 includes 8 data streams. Graph 700 of FIG. 7 includes two data streams found to have correlated data, and graph 800 of FIG. 8 includes four data streams that are correlated. By comparison of the clusters, variables with similar patterns are grouped together by the K-means clustering, with significant differences in patterns among groups.

Figure 6:
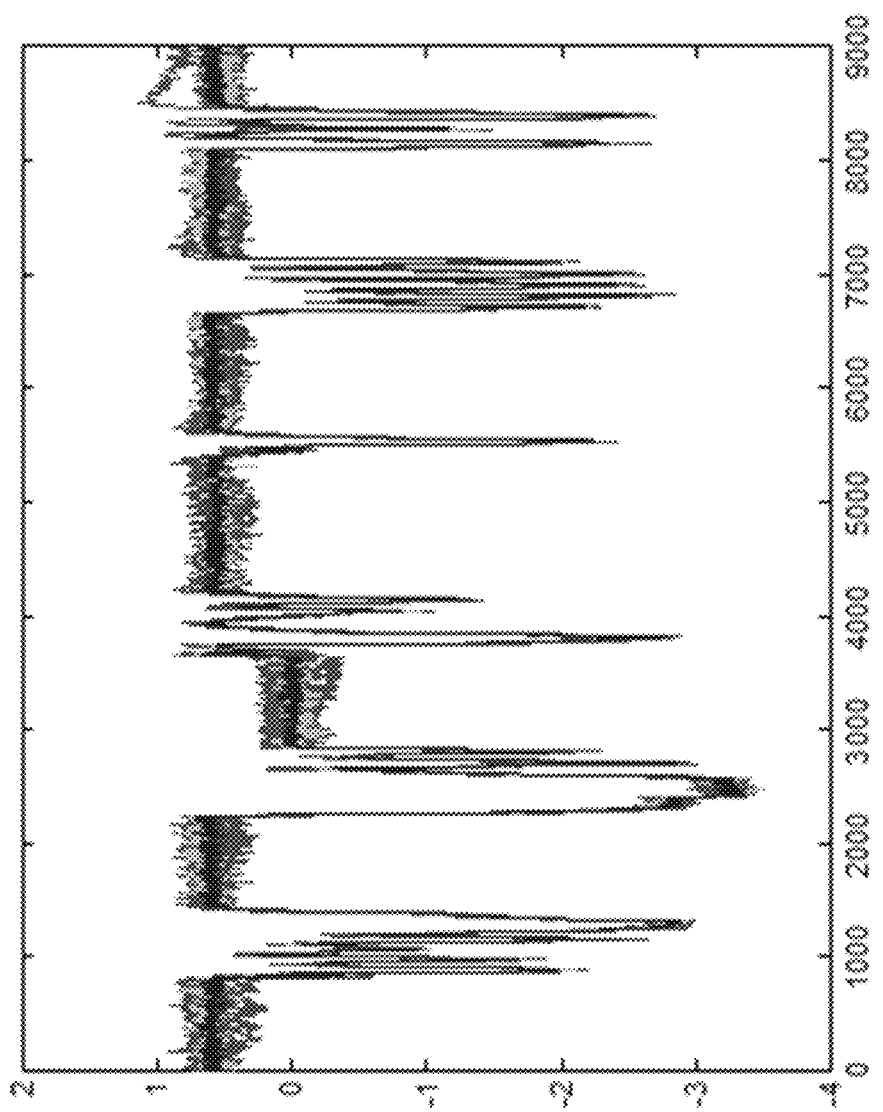
FIG. 6 illustrates a second cluster determined according to K-means clustering from among the dataset of FIG. 4, in an example embodiment.
Figure 7:
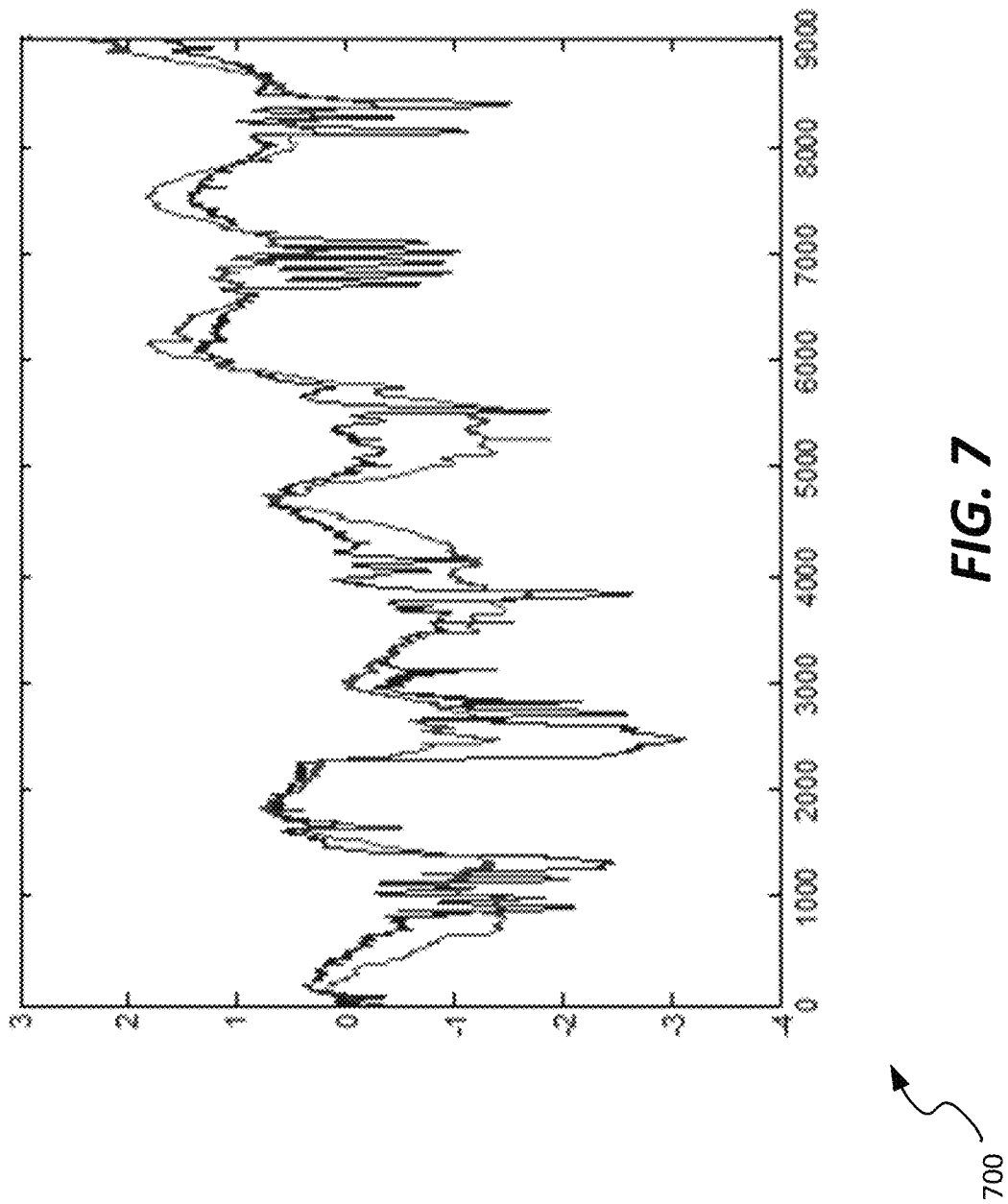
FIG. 7 illustrates a third cluster determined according to K-means clustering from among the dataset of FIG. 4, in an example embodiment.
Figure 8:
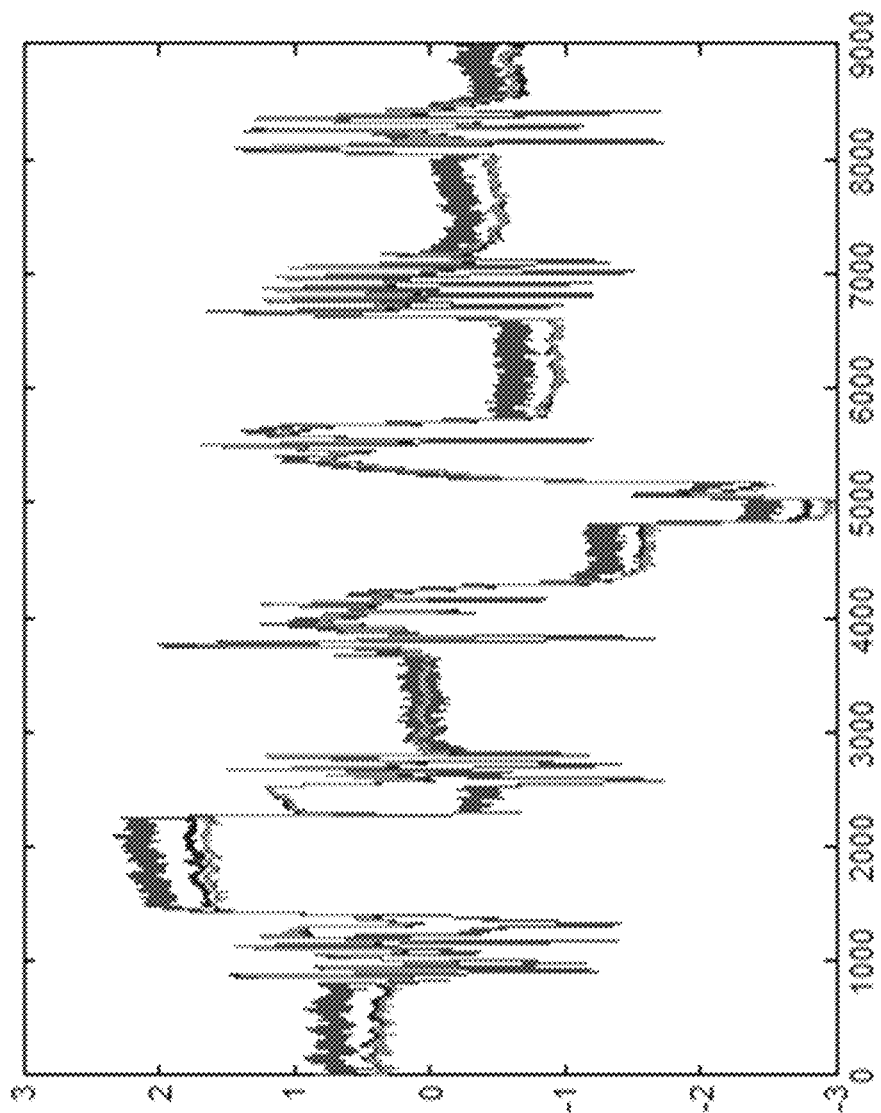
FIG. 8 illustrates a fourth cluster determined according to K-means clustering from among the dataset of FIG. 4, in an example embodiment.
Figure 9:
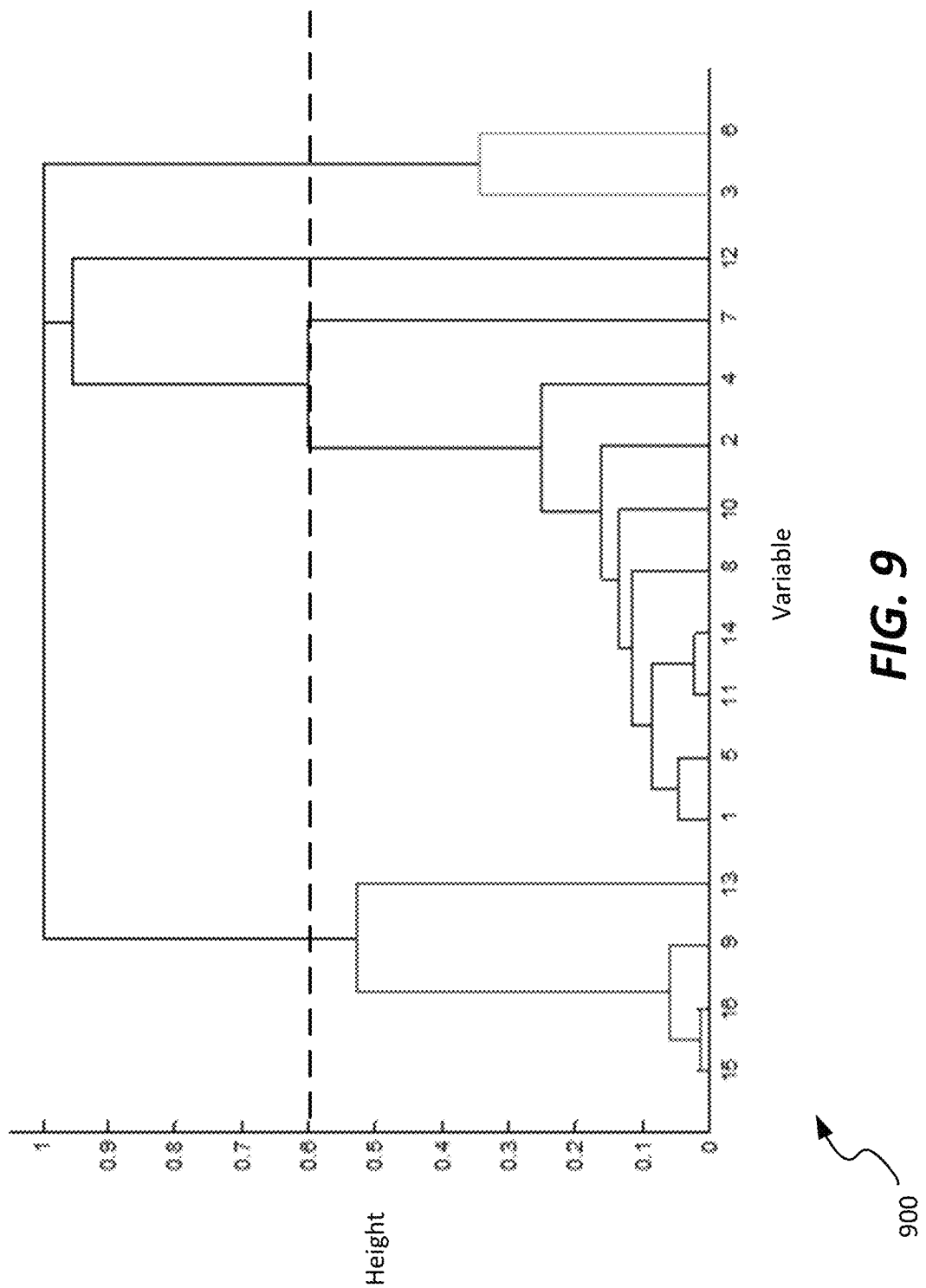
FIG. 9 illustrates a graph depicting results of a hierarchical clustering methodology applied to the dataset of FIG. 4, according to an alternative example embodiment.

By way of comparison, in alternative embodiments, the same data can be clustered using a hierarchical clustering methodology as previously mentioned. In such an example, nearest neighbors are paired in a hierarchical manner. FIG. 9 illustrates a dendogram (clustering diagram) 900 that shows a relationship among the 16 input values that were illustrated in FIG. 4. The vertical axis represents the distance between variables and clusters are determined by choosing a cut-off value on this axis. The smaller the cut-off, the smaller the distance between variables and therefore greater the correlation between them. In this example, a cutoff of 0.6 is used, implying that correlations within each clustered group are greater than 0.8. In this diagram, the 16 data streams are clustered into 5 groups, with groups 1, 2, and 5 being the same groups as achieved in the k-means clustering (as seen in FIGS. 5, 6, and 8), each including a plurality of variables. However, because a correlation of 0.8 is strictly enforced by the hierarchical clustering, the two data streams that were clustered in graph 700 of FIG. 7 are not clustered in the hierarchical clustering approach, and instead are treated as individual data streams for purposes of modeling and data cleansing.

Overall, in the context of the present disclosure, a variety of types of clustering processes may be performed. In the examples of FIGS. 4-9, either K-means or hierarchical clustering can be performed to achieve the clustering results required for use within the automated model building and maintenance systems of the present disclosure, with the specific clustering method selected and tuned (e.g., using user-defined number of clusters or cutoff levels) to the particular industrial process during initial setup. Of course, other clustering methods could be used as well, in alterative embodiments.

Referring now to FIGS. 10-14, after a clustering process is performed, a model is built for the data streams (data sources) that are included within the cluster. As noted above, in some embodiments, a DPCA modeling process can be used.

Although the DPCA modeling process incorporated by reference above represents one possible example of such a process, other modeling processes and even other DPCA modeling processes may be utilized. In some examples, a DPCA process is used for model building, and a different type of DPCA modeling process may be used for updating that model. For example, in such embodiments, a recursive DPCA process may be used for updating previously-created models. In such an arrangement, an updated mean vector is a weighted average of an original mean vector and a mean vector of newly received data. Once an updated mean vector is calculated, a difference between the updated mean vector and original mean vector can be used to update the variable variance and correlation matrix. Recursive updates for mean, variance, and correlation matrix can be reflected as follows:

$$m_{new} = \mu m_{old} + 1 - \mu)(X_{new})^T 1$$

$$\sigma_{new,i} = \mu(\sigma_{old,i} + \Delta m^2(i)) + (1-\mu)\frac{1}{n_{new}} \| X_{new}(:,i) - 1m(:,i) \|^2$$

$$R_{new} = \mu \sum\nolimits_{new}^{-1} \left( \sum\nolimits_{old} R_{old} \sum\nolimits_{old} + \Delta m \Delta m^T \right) \sum\nolimits_{new}^{-1} +$$
$$(1-\mu)\frac{1}{n_{new}} \sum\nolimits_{new}^{-1} (X_{new} - 1m^T)(X_{new} - 1m^T)^T \sum\nolimits_{new}^{-1}$$

In the above, m denotes the mean vectors (new and old), $X_{new}$ is newly received data, $\sigma_i$ is the standard variance of the $i^{th}$ variable, and $\Sigma$ is the diagonal matrix of standard deviations of the variables, $\Delta m$ is the difference of the new mean vector and the old mean vector, R is the correlation matrix, 1 is a column vector with 1's as its elements, and $n_{new}$ is the size of the newly received data. Additionally, $\mu$ is a forgetting vector, which controls the relative weight of old data and newly received data (e.g., the relative weight of old training data and updated training data). Based on a difference between a new correlation matrix and old correlation matrix, a singular value decomposition of the new correlation matrix can be calculated based on either a series of rank-one modifications or Lanczos tridiagonalization. Once the singular value decomposition (SVD) is performed, its output is used to determine updated control limits and an updated number of principal components, using the VRE (Variance of the Reconstruction Error) criterion. Details relating to VRE may be found, for example, in Qin, S. J., & Dunia, R. "Determining the number of principal components for best reconstruction." Journal of Process Control, 10, nos. 2-3 (2000), 245-250. Details regarding updating mean, variance and correlation matrix and singular value decomposition for a recursive PCA process are provided in: Li Weihua, et al., "Recursive PCA for Adaptive Process Monitoring." Journal of Process Control 10, no. 5 (2000): 471-486, the disclosure of which is hereby incorporated by reference in its entirety. Still further, DPCA processes are described in U.S. patent application Ser. No. 15/811,477, entitled "Fault Detection System Utilizing Dynamic Principal Components Analysis", and U.S. patent application Ser. No. 13/781,623, entitled "Scalable Data Processing Framework for Dynamic Data Cleansing", the disclosures of each of which are hereby incorporated by reference in their entireties.

Figure 10:
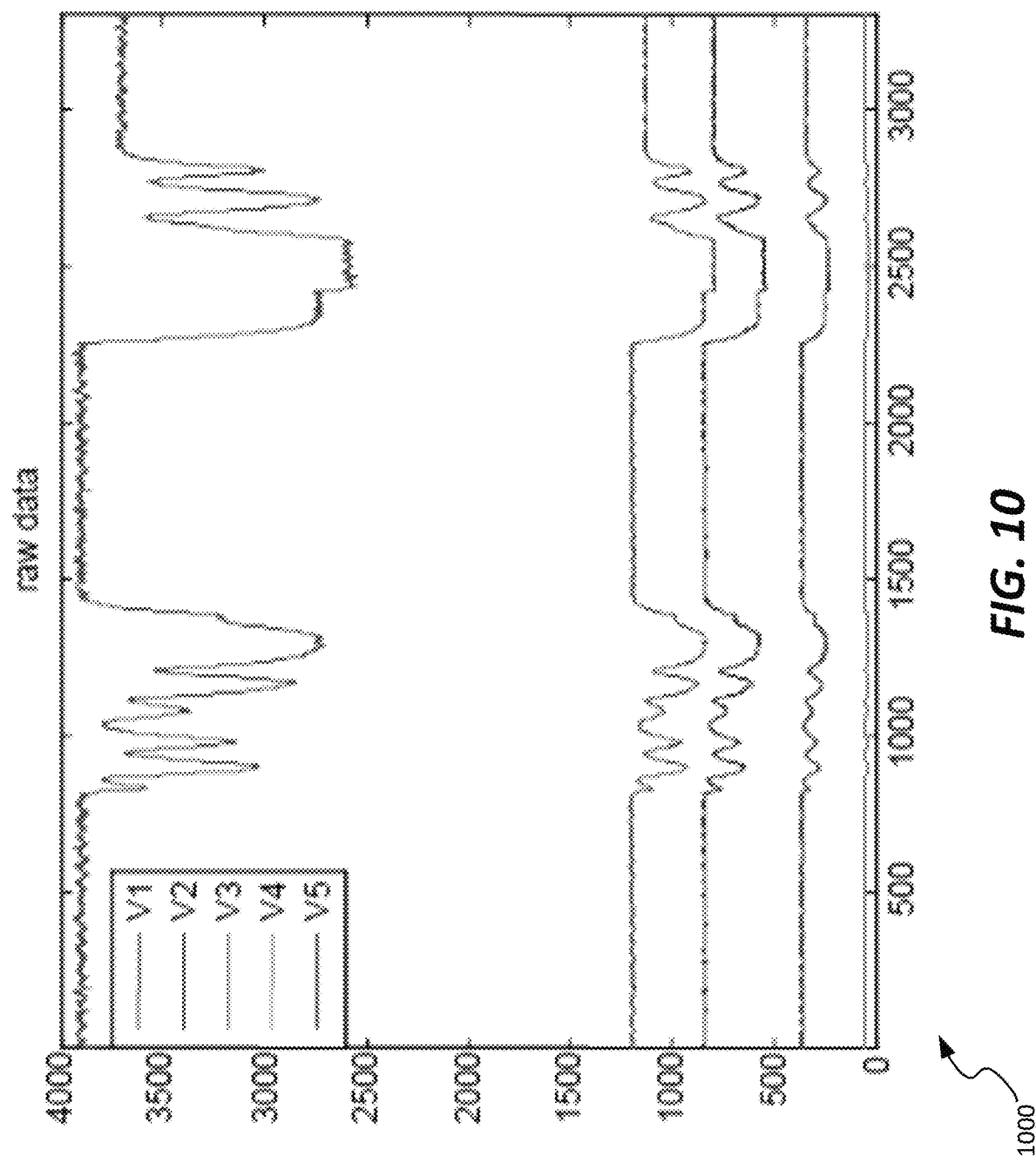
FIG. 10 illustrates a graph of sample steam generation process data on which an automated model building and maintenance system can be applied.

As seen in FIGS. 10-14, a set of 5 different variables with 3300 samples of each were used from a steam generating process to illustrate the improvement in DPCA-based data cleansing upon use of the model update method applied in the present disclosure. FIG. 10 shows a chart of the 3300 samples. In this example, a first 300 samples are used to build an initial DPCA model, and two separate process strategies are applied to illustrate the benefits of the automated updating described herein. In a first strategy, the initial DPCA model is used to monitor the process without updating. In a second strategy, the initial DPCA model is updated every 300 samples, and that updated model is used for process monitoring.

Figure 11:
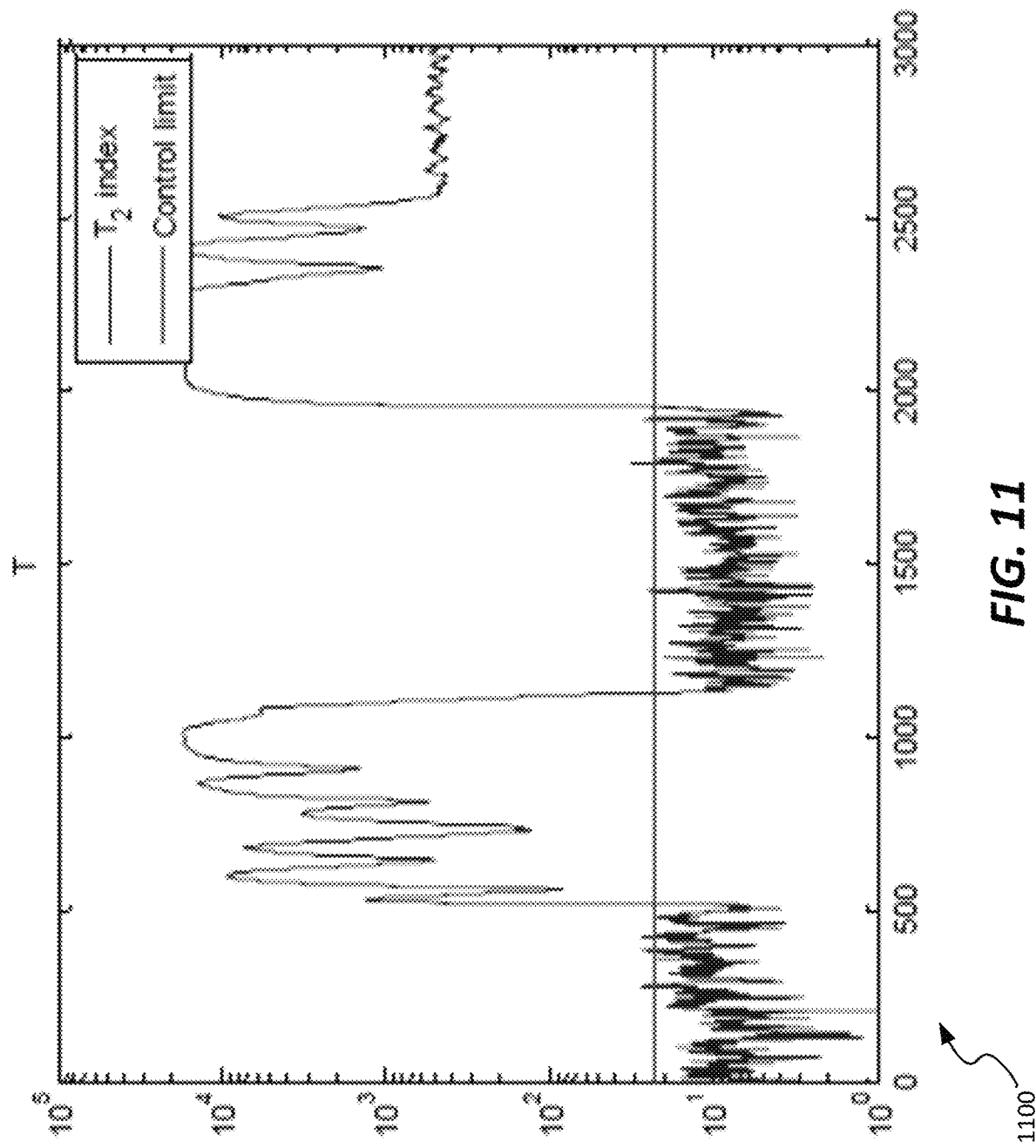
FIG. 11 illustrates a graph of dynamic principal components analysis (DPCA) statistics generated in association with the process data of FIG. 10 in an initial DPCA model, according to an example embodiment.
Figure 12:
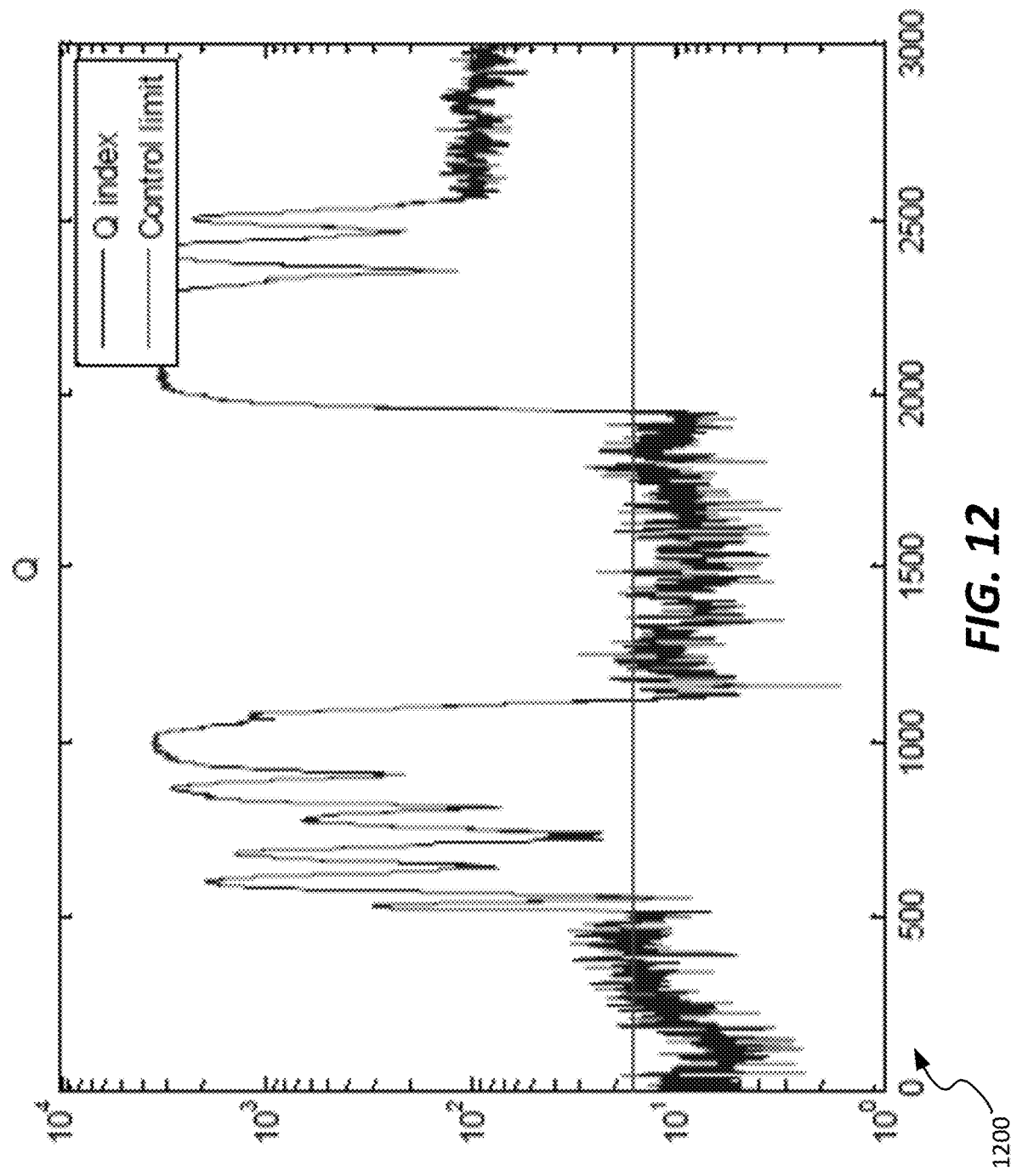
FIG. 12 illustrates a graph of additional dynamic principal components analysis (DPCA) model parameters generated in association with the process data of FIG. 10 in an initial DPCA model, according to an example embodiment.

FIG. 11 illustrates a chart 1100 that shows the $T^2$ index and control limit generated from an initial DPCA model, without including any model updating. Accordingly, these values are based on parameters set based on modeling from the first 300 samples in the data set seen in FIG. 10. Additionally, FIG. 12 illustrates a chart 1200 showing the Q index generated by the DPCA analysis from the first 300 samples.

Figure 13:
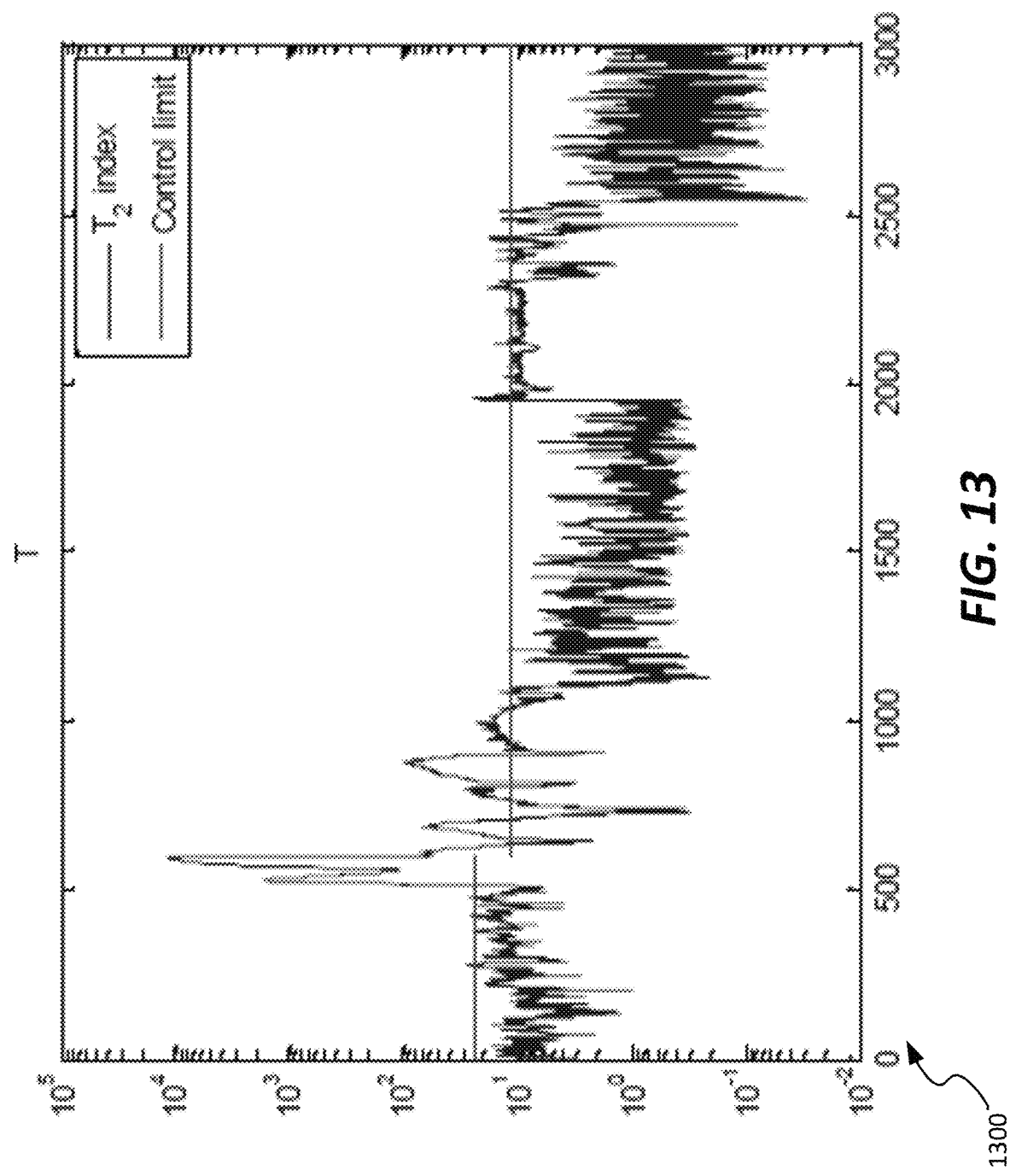
FIG. 13 illustrates a graph of dynamic principal components analysis (DPCA) model parameters generated in association with the process data of FIG. 10 in a periodically updated DPCA model, according to an example embodiment.
Figure 14:
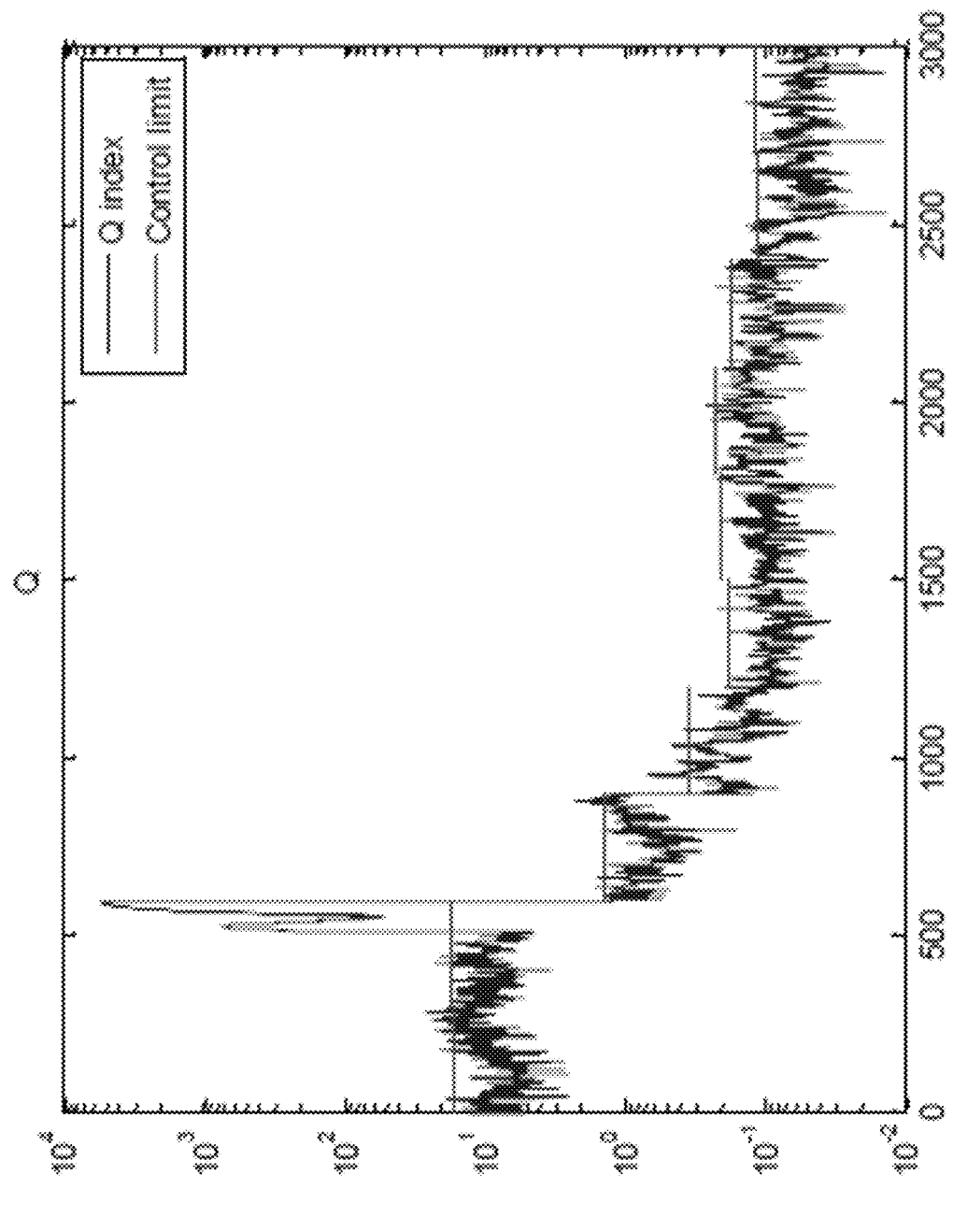
FIG. 14 illustrates a graph of additional dynamic principal components analysis (DPCA) model parameters generated in association with the process data of FIG. 10 in a periodically updated DPCA model, according to an example embodiment.

By way of comparison, in FIG. 13, a chart 1300 illustrates the $T^2$ index and control limit generated from a DPCA model that is periodically updated. As seen in chart 1300, the $T^2$ index and control limit adapt to changes in the model, notably after time=600 (the first model update time period). Additionally, FIG. 14 illustrates a chart 1400 showing the Q index and associated control limit generated by the DPCA analysis as periodically being adjusted (every 300 samples). As seen in this arrangement, without model updating, even though the process is operating normally, the Q and $T^2$ indices exceed their control limits frequently. However, in FIGS. 13-14, most Q and $T^2$ indices are below control limits. This reflects a significant reduction in false alarms that would be generated during normal operation of this steam generating process. This therefore has a real-world advantage of reducing the instances in which a user would have to assess alarms as potentially being related to process or sensor malfunction.

Referring to FIGS. 10-14 generally, it is noted that the updated modeling can be adjusted by a user to determine, e.g., the forgetting vector and size of newly received data to be used in the modeling process, as well as the frequency of model updates (e.g., within a user interface, such as discussed above in conjunction with FIG. 1). Furthermore, although the updates are illustrated herein with respect to the DPCA model, model updates are similarly applicable within the context of single-tag data cleansing, and similarly result in reduction of possible false alarms as to mis-operation of such data sources or sensors associated therewith. Accordingly, not only within a relatively simple 16-input process as described herein, but within the context of a highly-complex industrial process having potentially thousands of data streams, automation of models and updating can have a significant impact not only on user maintenance of the model but accuracy of the data cleansing and error detection processes performed with that model.

Referring generally to the systems and methods of FIGS. 1-14, and referring to in particular computing systems embodying the methods and systems of the present disclosure, it is noted that various computing systems can be used to perform the processes disclosed herein. For example, embodiments of the disclosure may be practiced in various types of electrical circuits comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, aspects of the methods described herein can be practiced within a general purpose computer or in any other circuits or systems.

Embodiments of the present disclosure can be implemented as a computer process (method), a computing system, or as an article of manufacture, such as a computer program product or computer readable media. The computer program product may be a computer storage media readable by a computer system and encoding a computer program of instructions for executing a computer process. Accordingly, embodiments of the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. For purposes of the claims, the phrase "computer storage medium," and variations thereof, do not include waves or signals per se and/or communication media.

While certain embodiments of the disclosure have been described, other embodiments may exist. Furthermore, although embodiments of the present disclosure have been described as being associated with data stored in memory and other storage mediums, data can also be stored on or read from other types of computer-readable media.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of automating building and maintaining of models of a physical process, the method comprising:
   receiving training data associated with a plurality of different data sources, each data source of the plurality of data sources being associated with a physical process;
   for at least one single data source of the plurality of different data sources, building a single source data model based at least in part on the training data associated with the single data source;
   automatically performing a data cleansing process on operational data based on the single source data model, the operational data corresponding to data collected from the single data source; and
   automatically updating the single source data model based at least in part on updated training data, the updated training data corresponding to recent data received as operational data.

2. The method of claim 1, further comprising, prior to performing the data cleansing process, pre-processing the training data.

3. The method of claim 1, further comprising generating an alert in response to detection that one or more of the plurality of data sources are providing faulty data.

4. The method of claim 3, wherein the one or more of the plurality of data sources providing faulty data comprise at least one of a faulty sensor or a process anomaly associated with an industrial process.

5. The method of claim 1, wherein the data model is automatically updated by a recursive dynamic principal components analysis (DPCA) process.

6. The method of claim 1, wherein the received training data comprises at least one of historical data and real-time data.

7. The method of claim 1, wherein the method further comprises pre-processing the training data to adjust at least a portion of the values included in the training data, the values corresponding to missing or outlier data.

8. The method of claim 1, wherein the physical process comprises an industrial process, and wherein the plurality of data sources comprises a plurality of sensors from which data describing the industrial process is received.

9. A method for automating building and maintaining of models of a physical process, the method comprising:
   receiving training data associated with a plurality of different data sources, each data source of the plurality of data sources being associated with a physical process;
   performing a clustering process on the training data associated with plurality of data sources to form one or more clusters, and wherein at least one single data source of the plurality of data sources is not included within the one or more clusters; and
   for each of the one or more clusters:
      building a data model based at least in part on the training data associated with the data sources included in the cluster; and
      automatically updating the data model based at least in part on updated training data, the updated training data corresponding to recent data received as operational data.

10. The method of claim 9, further comprising, prior to performing the clustering process, pre-processing the received training data.

11. The method of claim 10, wherein pre-processing the training data includes removing at least a portion of the training data in response to a determination that the portion of the training data corresponds to missing or outlier data.

12. The method of claim 9, wherein the one or more clusters includes at least a first cluster and a second cluster, and wherein an automatic data cleansing process is performed on the first cluster and an automatic data cleansing process is performed on the second cluster, and wherein the automatic data cleansing process performed on the first cluster is a different process than the automatic data cleansing process performed on the second cluster.

13. The method of claim 9, further comprising updating the data model for a cluster in response to at least one of: a user input, a predetermined time being elapsed, a determination that the data model performance has degraded by at least a predetermined amount, or exceeding a threshold on frequency of anomalous occurrences.

14. The method of claim 9, further comprising generating an alert in response to detection of an error in data received from at least one of the plurality of data sources.

15. A system for automatically monitoring sensors measuring parameters of a physical process, the system comprising:
   a communication interface configured to receive data from a plurality of different data sources associated with a physical process, the plurality of different data sources including one or more sensors associated with the physical process;
a processor communicatively connected to the communication interface;
a memory communicatively connected to the processor and communication interface, the memory storing instructions comprising an automated model building and maintenance application which, when executed by the processor, cause the system to:
automatically perform a clustering process on training data received from the plurality of data sources to form one or more clusters, the plurality of data sources further including at least one single data source not included within the one or more clusters; and
for each single data source:
build a single source data model based at least in part on the training data associated with the single data source; and
automatically update the single source data model.

16. The system of claim 15, wherein the clustering process is performed based on a predetermined cutoff level and a maximum number of data sources included in each cluster.

17. The system of claim 15, wherein the data model built for at least one of the one or more clusters comprises a dynamic principal components analysis (DPCA) based data model.

18. The system of claim 15, wherein the automated model building and maintenance application is configured to periodically automatically update the data model for one or more of the one or more clusters.

19. The system of claim 15, wherein the automated model building and maintenance application is further configured to generate an alert in response to detection of an error in data received from at least one of the plurality of data sources.

20. The system of claim 15, wherein the physical process comprises an industrial process, and wherein the plurality of data sources comprise a plurality of sensors from which data describing the industrial process is received.

* * * * *